(12) United States Patent
Stoica

(10) Patent No.: US 8,401,019 B2
(45) Date of Patent: Mar. 19, 2013

(54) METHOD, INTEGRATED CIRCUIT, AND COMMUNICATION UNIT FOR SCHEDULING A PROCESSING OF PACKET STREAM CHANNELS

(75) Inventor: Florin-Laurentiu Stoica, Sibiu (RO)

(73) Assignee: Freescale Semiconductor, Inc., Austin, TX (US)

( * ) Notice: Subject to any disclaimer, the term of this patent is extended or adjusted under 35 U.S.C. 154(b) by 294 days.

(21) Appl. No.: 12/738,421

(22) PCT Filed: Oct. 23, 2007

(86) PCT No.: PCT/IB2007/054302
§ 371 (c)(1),
(2), (4) Date: Apr. 16, 2010

(87) PCT Pub. No.: WO2009/053774
PCT Pub. Date: Apr. 30, 2009

(65) Prior Publication Data
US 2010/0226386 A1    Sep. 9, 2010

(51) Int. Cl.
*H04W 4/00* (2009.01)
*H04L 12/28* (2006.01)
*H04L 12/56* (2006.01)
(52) U.S. Cl. ............ 370/395.4; 370/328; 370/329; 370/338; 370/431
(58) Field of Classification Search .......... None
See application file for complete search history.

(56) References Cited

U.S. PATENT DOCUMENTS

| 6,728,265 | B1 * | 4/2004 | Yavatkar et al. ............ 370/468 |
| 6,975,629 | B2 | 12/2005 | Welin |
| 2004/0184463 | A1 | 9/2004 | Dauchy et al. |
| 2004/0252761 | A1 * | 12/2004 | Brown et al. ............ 375/240.12 |
| 2005/0063402 | A1 * | 3/2005 | Rosengard et al. ............ 370/412 |
| 2006/0013235 | A1 | 1/2006 | Farnham |

FOREIGN PATENT DOCUMENTS

| EP | 0989770 A | 3/2000 |
| EP | 1229444 A1 | 7/2002 |
| JP | 200032551 | 1/2000 |
| JP | 2002312331 | 10/2002 |
| JP | 200674728 | 3/2006 |
| WO | 2007/104330 A1 | 9/2007 |

OTHER PUBLICATIONS

International Search Report and Written Opinion correlating to PCT/IB2007/054302 dated Aug. 12, 2008.

* cited by examiner

*Primary Examiner* — John Blanton
*Assistant Examiner* — Diane Lo (57) ABSTRACT

A method for scheduling a processing of packet stream channels comprises: determining whether at least one packet stream channel comprises a frame ready for processing; if at least one packet stream channel comprises a frame ready for processing, identifying a frame ready for processing having a highest priority; and scheduling the identified highest priority frame for processing. The method further comprises prioritising frames ready for processing based on at least one of: a frame availability time and an estimated processing time, for each frame.

20 Claims, 6 Drawing Sheets

METHOD, INTEGRATED CIRCUIT, AND COMMUNICATION UNIT FOR SCHEDULING A PROCESSING OF PACKET STREAM CHANNELS

FIELD OF THE INVENTION

The field of the invention relates to a method, an integrated circuit and communication unit for scheduling a processing of packet stream channels, and more particularly to a method, integrated circuit and communication unit for scheduling a processing of media, such as video, stream channels.

BACKGROUND OF THE INVENTION

Video and other types of media are increasingly being delivered over the Internet and other networks, in a form of media streams utilising standardised packet formats, such as the Real-time Transport Protocol (RTP) developed by the Internet Engineering Task Force (IETF), and defined in RFC 3550. RTP provides end-to-end network transport functions that are suitable for applications transmitting real-time data, such as audio, video or simulating data, over multicast or unicast network services. RTP is augmented by a control protocol, called Real-time Control Protocol (RTCP), to allow monitoring of the data delivery in a manner that is scalable to large multicast networks, and to provide minimal control and identification functionality.

It is well known for media services, such as video streaming and the like, to be provided to different types of media terminals, ranging from mobile devices, such as mobile telephone handsets, to desktop computers etc. As will be appreciated by a skilled artisan, due to the varying capabilities and requirements of media terminals and their respective communication paths, it is typically the case that different mobile terminals have different media requirements. Examples of such differing media requirements for video streaming may include, for example, encoding requirements, frame rate requirements, bit rate requirements, frame size requirements, etc.

In order to enable the provision of media services to different media terminals having differing media requirements, without the need to provide a duplicate of each service for every combination of media requirement, it is known to use apparatus such as gateways through which media terminals may access media services. In this manner, the gateway processes received media streams and converts them into the required formats for each media terminal accessing the media services there through.

Thus, a gateway is required to be able to process a plurality of simultaneous media streams, each stream comprising packets of data arriving asynchronously. Furthermore, the gateway is required to maximise the channel density for media frames processed thereby, whilst minimising the latency of the media streams through the gateway so that each packet is processed and the result output within a period that is less than a delay threshold.

In order to improve the processing of media content, it is known to prioritise the processing of media frames based on their deadlines by which they are required to be processed; media frames generally having the most imminent deadlines by which they are required to be processed are processed first. Typically, such deadlines are based on a time limit within which a frame is required to be processed following the receipt of the first data packet of that frame. In this manner, fewer media frames will tend to be dropped as a result of them not being processed by their deadline, thus improving the channel density of received media streams.

U.S. Pat. No. 6,975,629, titled 'Processing packets based on deadline intervals', describes a mechanism whereby first and second data packets are prioritized using deadline intervals of each data packet. This patent teaches a mechanism whereby the data packet with the closest deadline is scheduled first.

However, such known techniques fail to take into account other considerations, such as data type, processing requirements etc. Consequently, such known techniques fall short of optimising the channel density for each media stream, whilst minimising the latency of the media streams through the gateway.

Thus, a need exists for an improved method and apparatus for scheduling a processing of packet stream channels, such as media stream channels.

SUMMARY OF THE INVENTION

In accordance with aspects of the invention, there is provided a method and apparatus for scheduling the processing of packet stream channels, such as media stream channels, as defined in the appended Claims.

Specific embodiments are set for the in the dependent claims.

BRIEF DESCRIPTION OF THE DRAWINGS

Exemplary embodiments of the present invention will now be described, by way of example only, with reference to the accompanying drawings, in which.

DESCRIPTION OF EMBODIMENTS

Embodiments of the invention will be described in terms of a method and apparatus for scheduling a processing of packet stream channels, such as media stream channels. Although embodiments of the invention will be described in terms of a media gateway, such as a Media Resource Function Processor (MRFP) within an Internet Protocol (IP) Multimedia Sub-System (IMS), it will be appreciated that the inventive concept herein described may be embodied in any apparatus required to process a plurality of packet stream channels.

In summary, the inventive concept proposes a method and apparatus for scheduling a processing of packet stream channels comprising: determining whether at least one packet stream channel comprises a frame ready for processing; if at least one packet stream channel comprises a frame ready for processing, identifying a frame ready for processing having a highest priority; and scheduling the identified highest priority packet stream channel for processing. The method further comprises the step of prioritising, where an apparatus is further arranged to prioritise, frames ready for processing based at least on a frame availability time and an estimated processing time for each frame.

Figure 1:
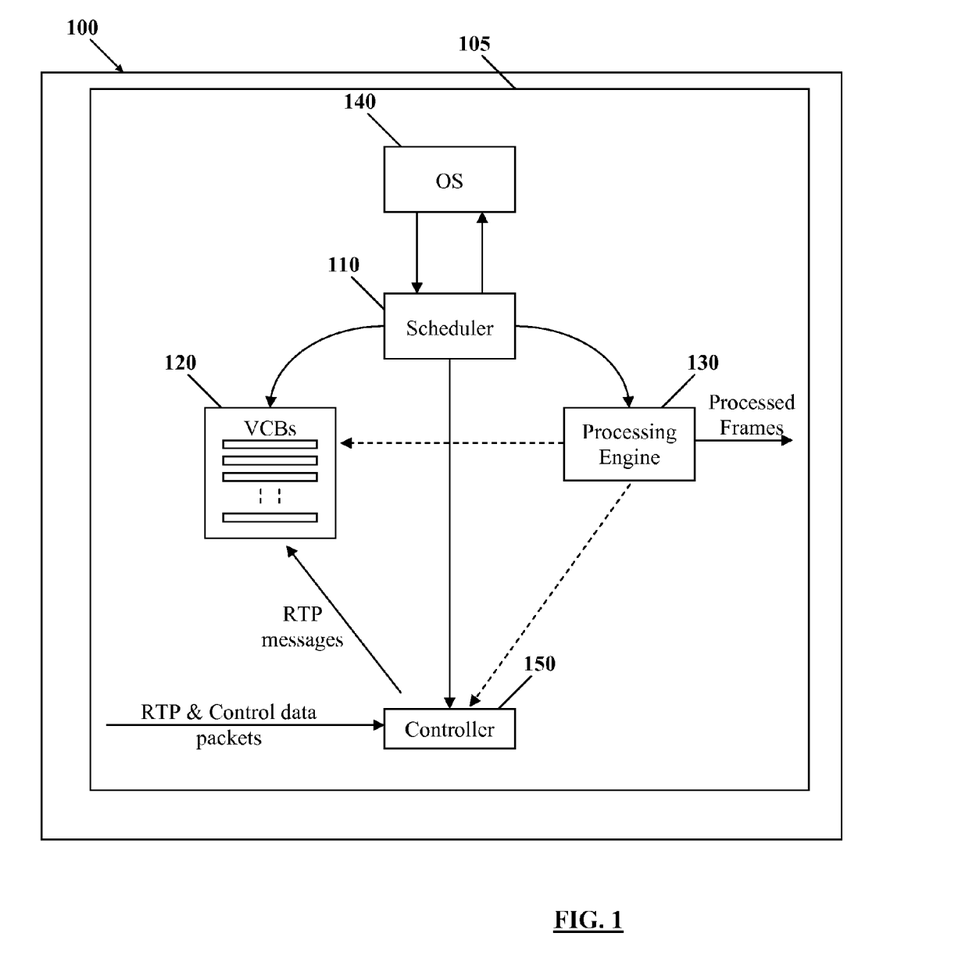
FIG. 1 illustrates a communication unit comprising a gateway adapted according to some embodiments of the invention.

Referring now to FIG. 1, there is illustrated a communication unit 100 comprising an integrated circuit arranged to function as a gateway 105 according to some embodiments of the invention. The gateway 105 comprises scheduler 110, at least one media congestion buffer, which for the illustrated embodiment is in a form of a plurality of video congestion buffers (VCBs) 120, and a processing engine 130.

The gateway 105 is arranged to receive a plurality of substantially simultaneous media streams. The media streams may for example be video and/or audio streams and for example consist of a stream of video frames from which a sequence of images presenting scenes in motion can be generated and outputted in a for humans perceptible form. By way of example, the gateway 105 may comprise a Media Resource Function Processor (MRFP) within an Internet Protocol (IP) Multimedia Sub-System (IMS). IMS is an architectural framework for delivering IP multimedia to mobile users. It was originally designed by the wireless standards body, referred to as $3^{rd}$ Generation Partnership Project (3GPP), and is part of a vision for evolving mobile networks beyond the 2nd generation of wireless communication referred to as Global System Mobile communication (GSM).

For the illustrated embodiment, the gateway 105 receives media streams in a form of media frames comprising one or more Real-time Transport Protocol (RTP) data packets. As will be appreciated by a skilled artisan, data packets typically arrive synchronously. Consequently, the RTP data packets relating to a media frame may arrive out of order, and with varying delays.

The gateway 105 comprises a VCB 120 for each media stream channel. Each VCB 120 is arranged to store received data packets for its respective media stream channel, and to sort and order the received data packets into their respective frames. For the illustrated embodiment, data packets, in a form of RTP data packets, are received by a controller 150, and forwarded to the appropriate VCBs 120.

Figure 2:
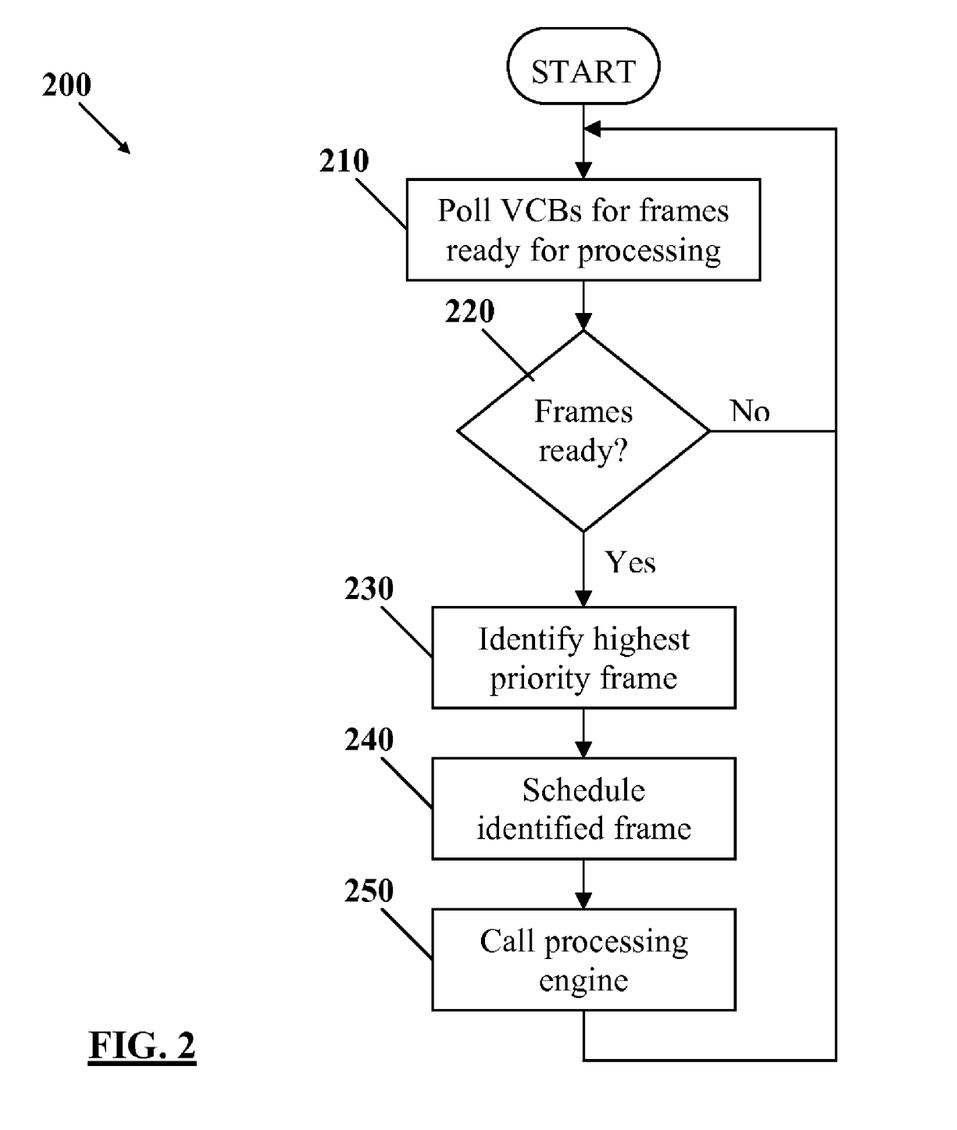
FIG. 2 illustrates a flow chart of a method of scheduling media stream channels according to an embodiment of the invention.

The scheduler 110 comprises scheduler logic to support a main function, or process, arranged to run substantially continuously and schedule media streams. FIG. 2 illustrates a flow chart 200 of a method of scheduling media stream channels according to an embodiment of the present invention, and as performed by the scheduler logic function of the scheduler 110.

The method in FIG. 2 starts, for example following initiation of the scheduler 110 of FIG. 1, or more particularly the scheduler logic, by, say, an operating system (OS) 140 or other management control component of the gateway 105. The scheduler 110 then determines whether at least one media stream channel comprises a frame that is ready for processing, for example by polling the VCBs 120 to acquire a status of a plurality of media channel frames, in step 210.

Next, in step 220 of FIG. 2, if at least one media stream channel comprises a frame ready for processing, the scheduler logic and identifies the frame ready for processing having a highest priority as illustrated in step 230. If no frames are ready for processing, the scheduler logic loops back to step 210, and continues to poll the VCBs until at least one received frame is ready for processing.

Once a particular frame from a plurality of frames and having a highest priority has been identified, the method moves to step 240, where the scheduler logic schedules the identified frame for processing by the processing engine, for example processing engine 130. Next, in step 250, the scheduler logic calls the processing engine 130 to process the scheduled frame. The method then loops back to step logic, and the schedule 210 polls the VCBs 130 for further frames that are ready for processing.

Referring back to FIG. 1, and in accordance with some embodiments of the invention, the scheduler logic 110 schedules a frame for processing by initialising resources for the processing of the frame. Initialising resources for the processing of the frame may comprise, for example, instructing a Direct Memory Access (DMA) unit (not shown), for example via the OS 140, to load frame data into memory for processing engine 130. In this manner, the DMA may be used to transfer frame data from, for example, relatively slow, but large, external memory to relatively fast, but small, internal memory. The processing of the frame data is performed when the data is in the internal memory. The frame data may subsequently be saved back into the external memory once it has been processed.

Frame data loaded into memory by the DMA may comprise persistent data for the processing engine, comprising data relating to the context of the channels to which the frames relate. For example, the processing engine 130 may comprise a video transcoder for processing video frames. Such a video transcoder may require data relating to the last frame processed for that channel in order to 'transcode' a new frame for that channel.

As will be appreciated by a skilled artisan, DMA units are capable of running in parallel with the execution of a processor within the same signal processing system. Accordingly, and in accordance with some embodiments of the invention, two memory locations may be used from which the processing engine 130 is arranged to process frames. In this manner, whilst the processing engine 130 is processing a frame using frame data from a first memory location, the DMA loads frame data for a subsequent frame to be processed into a second memory location.

Figure 3:
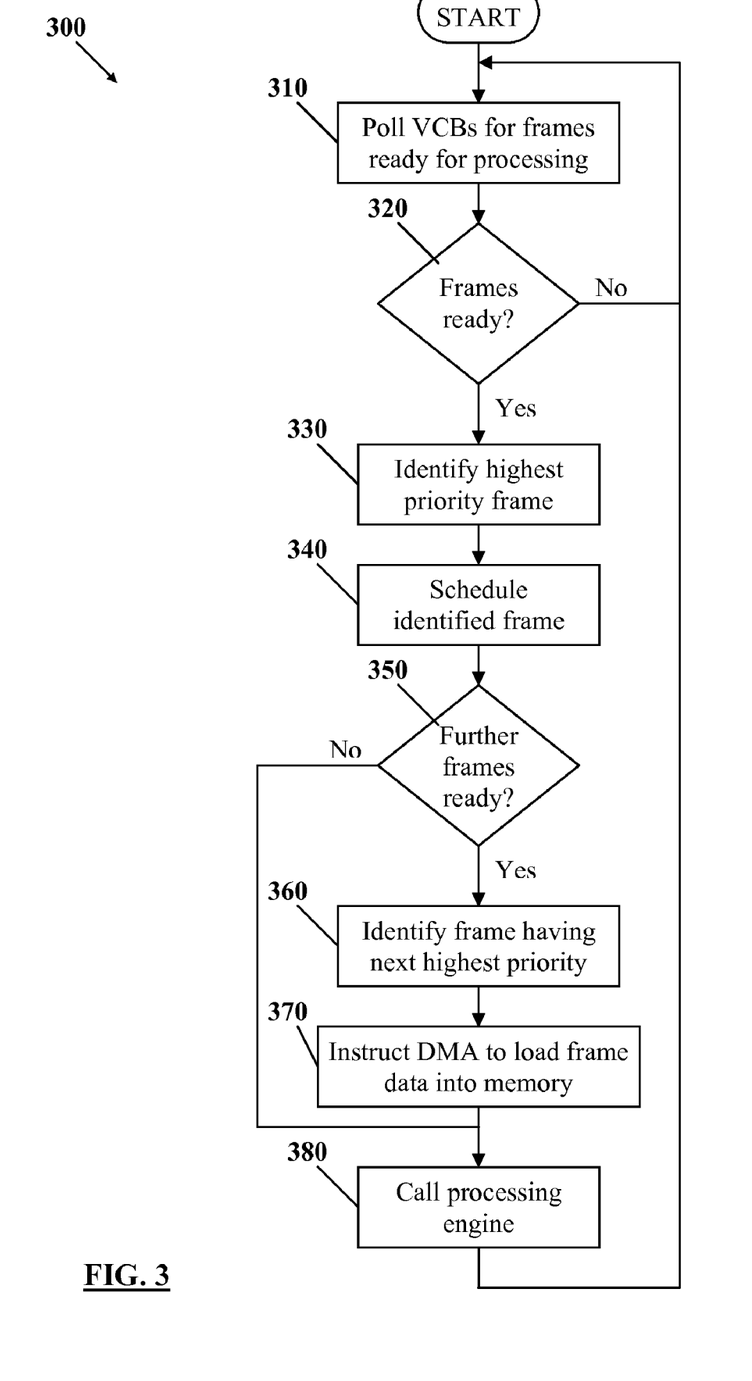
FIG. 3 illustrates a flow chart of a method of scheduling media stream channels according to an alternative embodiment of the invention.

Referring now to FIG. 3, a flowchart 300 illustrates a method of scheduling media stream channels according to alternative embodiment of the invention.

In the same manner as for the method of FIG. 2, the method commences, for example, following an initiation of the scheduler logic by, say, an operating system (OS) 140 or other component of the gateway 105 of FIG. 1. The scheduler logic then polls the VCBs to acquire a status of media channel frames, and in particular to determine whether any media stream channels comprise a frame that is ready for processing, as shown in step 310.

Next, in step 320, if at least one media stream channel comprises a frame ready for processing, the scheduler logic 110, moves on to step 330, and identifies a frame ready for processing and having a highest priority. If no frames are ready for processing, the scheduler logic loops back to step 310, and continues to poll the VCBs 120 until at least one frame becomes ready for processing. In an alternative embodiment, if no frames are ready for processing, the scheduler may perform other functions, such as logging, timers, etc., prior to looping back to step 310 to poll the VCBs 120 again.

Once a frame having a highest priority has been identified, the method moves to step 340, where the scheduler logic schedules the identified frame for processing by the processing engine say processing engine 130 of FIG. 1. For example, the scheduler logic checks to see if frame data (for example persistent data of the channel of the frame) for the identified frame has been loaded into internal memory for processing. If frame data for the identified frame has not been loaded into memory, the scheduler logic instructs the DMA unit to load the frame data into memory. Next, in step 350, the scheduler logic determines whether further frames are ready for processing.

If one or more further frames are ready for processing, the method moves to step 360, where the scheduler logic identifies a further frame ready for processing having a next highest priority. Next, in step 370, the scheduler logic instructs the DMA unit to load frame data for the identified further frame into memory for the processing of the frame. The scheduler logic then calls the processing engine, for example processing engine 130 of FIG. 1, in step 380, in order for the processing engine to process the frame identified as having the highest priority frame, in step 330, to be processed.

Referring back to step 350, if no further frames are ready for processing, the method moves directly to step 380, where the scheduler logic calls the processing engine in order for the processing engine to process the frame identified as having the highest priority frame, in step 330.

Figure 4:
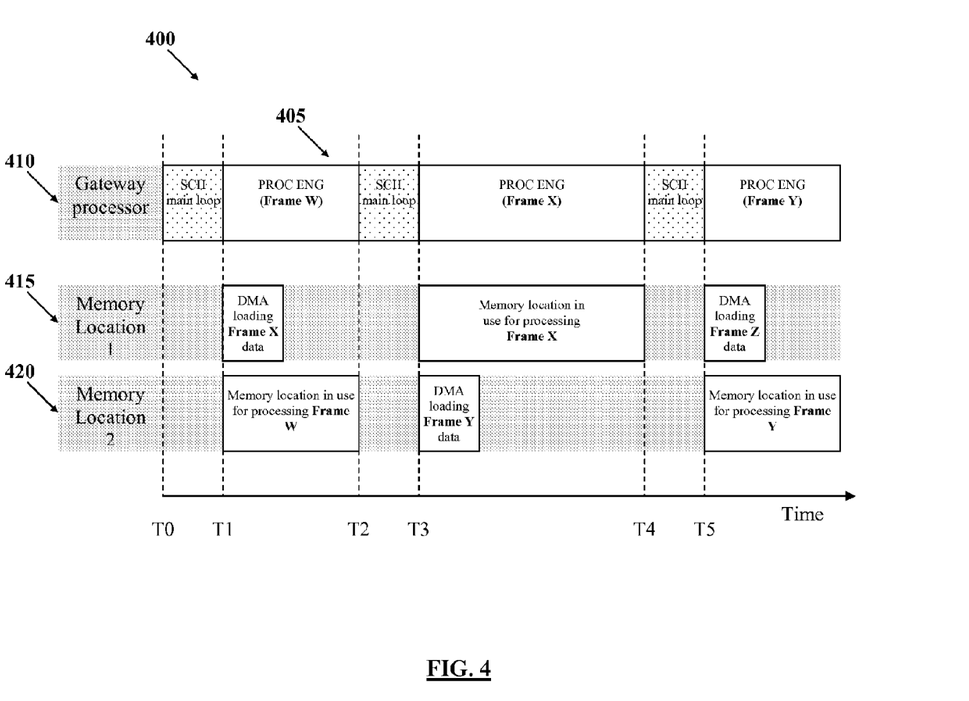
FIG. 4 illustrates a timeline for a signal processor executing a main function of a scheduler and a processing engine, and memory location activity for locations used by the processing engine in accordance with an embodiment of the invention.

Referring now to FIG. 4, there is illustrated a graphical representation of a timeline 400 for signal processing operations employed by, say, the scheduler logic 110 and the processing engine 130 of FIG. 1, the scheduler logic 110 and processing engine 130 being executed by gateway processor 410. The timeline 400 also indicates memory location activity for memory locations 415, 420 used by the gateway processing engine of FIG. 1 in accordance with an embodiment of the invention.

The illustrated timeline starts at time T0 with scheduling (SCH_main_loop), being executed by the scheduler logic. As previously mentioned, the SCH_main_loop sub-routine employed by the scheduler logic of FIG. 1 polls the VCBs for frames ready to be processed. Once one or more frames are ready to be processed, the SCH_main_loop sub-routine identifies and schedules for processing the frame that is identified as being ready for processing with the highest priority (Frame W). The SCH_main_loop sub-routine then determines whether further frames are ready for processing, and if so the scheduler logic instructs the DMA unit to load frame data for the identified further frame (Frame X) into memory.

At time T1, the SCH_main_loop sub-routine calls the processing engine for example processing engine 130 of FIG. 1, in order for the processing engine to process the frame identified as having the highest priority frame to be processed (Frame W) 405.

The signal processor is arranged to execute the processing engine at a higher priority than the SCH_main_loop sub-routine. In this manner, when the SCH_main_loop calls the processing engine, the signal processor stops executing the SCH_main_loop sub-routine, and executes the processing engine. The processing engine processes the scheduled frame (Frame W 405), based on frame data loaded in the appropriate memory location, which at that instance in the timeline is memory location '2' 420. The processing engine may, prior to processing the scheduled frame, call a controller, such as controller 150 in FIG. 1, in order to retrieve control and configuration messages for the particular channel to which the scheduled frame relates. Alternatively, the SCH_main_ sub-routine may call and retrieve such control and configuration messages as part of scheduling the frame for processing, and pass them to the processing engine.

As previously mentioned, the SCH_main_loop sub-routine determined whether further frames were ready for processing, and if so instructed the DMA unit to load frame data for the identified further frame (Frame X) into memory. Thus, as illustrated in FIG. 4, whilst the processing engine processes frame W from location '2' 420, the DMA unit stores the existing data from memory location '1' 415 (if it was valid data) and loads frame data for the next frame (Frame X) into memory location '1' 415.

Once the processing engine finishes processing Frame W, at time T2, the signal processor resumes executing the SCH_main_loop sub-routine. The SCH_main_loop sub-routine then loops back, the process starts again for the next frame (Frame X) and so on.

As will be appreciated by a skilled artisan, by preloading frame data into memory for the processing of a frame, whilst a previous frame is being processed, the processing engine 130 is not delayed in processing the frame whilst the frame data is being loaded. Thus, frames that are ready for processing are prioritised for processing based, at least, on a frame availability time and an estimated processing time for each frame. For example, in one embodiment of the invention it is envisaged that the priority of a frame ready for processing may be based on:

$$P_f = \text{frame\_delay} - \text{channel\_processing\_length}$$

Here, the frame_delay is measured by the scheduler logic, and substantially equates to a difference between the frame availability time and a current time. For example, as previously mentioned, a frame comprises one or more data packets. The incoming data packets are sorted into queues, or buffers (VCBs) and each channel in one embodiment of the invention, has its own buffer. When a data packet is received by the gateway, its arrival time is stored together with the data packet. When all the data packets that make up a frame have been received, the frame is considered to be 'available'. The availability is computed as the oldest arrival time of the data packets that make up the frame.

In one embodiment of the invention, the gateway has to measure the elapsed time from the moment the frame was "available" until the current time. It is envisaged that this may be done by one of the following methods:

(i) using a global timer that is referenced by each channel,
(ii) having a dedicated timer per channel.

In this embodiment, the timer may be used to store the receive moments of the packets and to compute the frame delay therefrom.

An exception to this may be when a data packet is lost, and the frame is incomplete. After a waiting time for the frame to become complete expires, the frame is considered 'ready for processing', even though it is incomplete. The moment when the waiting time expires may be considered the availability time for the incomplete frame.

The 'channel_processing_length' value is an estimation of a length of time required to process the frame, based on information stored in memory for every frame processing permutation. For example, the processing time for every frame processing permutation may be measured over a period of time, and an average for each permutation stored in memory. The permutation that corresponds to the required processing for that frame is retrieved from memory. The average processing times may be continually updated in order to maintain as accurate values as possible for the 'channel_processing_length'. The various permutations may vary in terms of parameters, such as, in case of video media, input and output video standards, image size, etc.

In this manner, the processing of frames is prioritised not only in relation to how long a frame has been ready for processing (and thereby in relation to a deadline by which it is to be processed), but also on how quickly the frame can be processed. In this manner, frames requiring only a small amount of processing are prioritised ahead of frames that require a large amount of processing. Consequently, frames requiring a small amount of processing will not be held up by frames requiring a large amount of processing, thereby resulting in greater channel density, whilst reducing latency of the media streams through the gateway.

As will be appreciated by a skilled artisan, the processing of a frame may comprise, by way of example, at least one of the following:

(i) changing an encoding of frames/data packets from one standard to another: for example, in a case of an input video media stream, changing the encoding from a video codec standard such as H.263 to a video codec standard such as H.264;

(ii) changing a frame rate for an input media stream;

(iii) changing a bit rate for an input media stream; and/or (iv) changing a frame size of an input media stream; for example from a format such as the Common Intermediate Format (CIF), used to standardise the horizontal and vertical resolutions in pixels of YCbCr sequences (a family of colour spaces used in video and digital photographic systems) in video signals, to a format such as Quarter CIF (QCIF).

In accordance with an alternative embodiment of the invention, prior to the processing of a scheduled frame, the latency of that frame may be re-estimated. In this embodiment, if the latency exceeds a latency threshold, e.g. if a processing of the scheduled frame is to be completed after a deadline by which the scheduled frame is require to be processed, the frame is processed in an 'urgent' mode.

By way of example, the processing engine may comprise a transcoder, which comprises a decoder and an encoder that are coupled. In, for example, a case where a frame is required to be processed in less than 50 msec after it becomes available, but the scheduler logic determines that this would not be achieved if the frame was fully processed, the scheduler logic may instruct the processing engine to process the frame in an 'urgent' mode. In 'urgent' mode only the decoder part of the transcoder may be configured to run. Hence, in such a case, the transcoder decodes the incoming data stream and stays synchronized with the source. However, the transcoder will not encode the data stream. Therefore, there will be no output frame, but there will be frame 'skips'. As only the decoder part of the transcoder runs, the channel requires less processing, will complete faster and will release the processor earlier for processing other channels. Hence, a congestion period will be resolved by sacrificing the channels that are doomed anyway, since they are going to complete processing too late and are therefore only wasting processing power.

At the destination there will be a slight drop in perceived quality due to the skipped frames. However, this drop in quality will be less than the case when the transcoder loses synchronization with the source. In this manner, graceful degradation is provided when the system is overloaded. Furthermore, since the time to complete processing in the 'urgent' mode is reduced, the processing of the frame may be completed within the required time limit (e.g. 50 msec after the frame becomes available), and as such the channel remains synchronised with the input media stream for that channel.

In one embodiment of the invention, the video encoding is performed partially by encoding only the difference between consecutive frames. For example, frame '1' may be fully encoded (with no reference aspect), with frame '2' then encoded using reference frame '1' and any determined difference. In this scenario, only the difference between the two frames is encoded. Thereafter, frame '3' may be encoded with reference to frame '2', and so on. However, if frame '2' is not decoded, frame '3' is unable to be reconstructed correctly. In this situation the transcoder will, in effect, lose synchronisation with the video source. This error propagates until the video source sends a new 'I'-frame.

As indicated before, it is still beneficial to a user to perform decoding when encoding is not provided. For example, let us consider that frame '2' runs in urgent mode, and as such it will not be encoded, and frame '3' runs as normal, and as such it will be decoded correctly (because frame '2' was decoded and exists in the transcoder), and will thus be encoded. The benefit for the user is that even if it does not see 'frame 2' transcoded, it will see frame 3 and all subsequent frames as normal.

It is further envisaged that frames may further be prioritised based on a channel history for those frames, for example based on a frequency with which frames within a channel are processed in 'urgent' mode. For example, the priority of a frame ready for processing may be provided by:

$$P_f = \text{frame\_delay} - \text{channel\_processing\_length} + \text{urgent\_cnt}$$

where 'urgent_count' comprises a statistic of the frame channel, for example, a number of times that frames of that channel have been processed in urgent mode.

In this manner, the history of the channel, in a form of a number of times that frames of the particular channel have been processed in urgent mode, can be taken into account. As such, since a frame processed in urgent mode may not, in a case of a video frame, be viewable, it is undesirable for frames of any one particular channel to be processed in urgent mode more often than is necessary. Accordingly, by incorporating a channel history factor into the prioritisation of frames, the processing of frames in urgent mode may be more evenly spread over all channels, thereby resulting in a fairer processing of channels.

In accordance with a still further embodiment of the invention, the scheduler logic may prioritise frames to be processed based, on a data content of the frames, for example, based on the media type. As will be appreciated by a skilled artisan, in a case of video media, frames typically belong to one of three classes of frame: I-frames, P-frames and B-frames.

In this regard, 'I'-frames are encoded using only spatial information. The encoding endeavours to eliminate any redundant information from the frame itself. For example, if there is a region of the picture (frame) comprising, say sky, it is likely that all points within that region are substantially the same, and thus the information for that region can be heavily compressed. Since compression in this manner is based solely on information within the frame, I-frames can be decoded without requiring information on previous or subsequent frames.

Furthermore, 'P'-frames are encoded using spatial and temporal information. The spatial information is used in the same way as for T frames. However, the temporal information refers to information obtained from previous frames. For example, an image appearing in successive pictures (frames), even if appearing at different positions, can be encoded by referring to the previous frame. In this manner, a 'P'-frame may only be able to be decoded if the previous frames(s) referred to are also available, and not if the 'P' frame only exists on its own.

'B'-frames do not tend to be commonly supported. However, for completeness, 'B'-frames use as a reference both previous frames and subsequent frames for the purpose of encoding. Accordingly, a 'B'-frame may only be able to be decoded if both previous and subsequent frames that are referred to are also available.

In this manner, in this embodiment of the invention, the priority of a frame that is ready for processing may be provided by:

$$P_f = \text{frame\_delay-channel\_processing\_length} + \Delta^{frame\_type}$$

where $\Delta^{frame\_type}$ is a parameter that represents a frame type, enabling a priority of the frame to be increased based on the type of frame. For example 'I'-frames may be provided a higher priority than 'P'-frames by setting the $\Delta$ frame_type parameter for 'I'-frames higher than the $\Delta$ frame_type parameter for 'P'-frames. It is envisaged, in this embodiment, that the $\Delta$ frame_type parameters may be constant or alternatively may be varied dynamically. For example, the $\Delta$ frame_type parameters may be varied depending on traffic congestion. In this manner, where there is limited or no congestion, the $\Delta$ frame_type parameters may be set substantially the same for all frame types, such that all frames are treated substantially equally. However, when there is a high amount of congestion, the $\Delta$ frame_type parameter for I-frames, for example, may be set higher than that for P-frames, providing I-frames with a higher priority. Thus, when a channel is required to have more quality than other channels, the $\Delta$ for this channel may be arranged to be larger than the $\Delta$ used by other channels (e.g. the P-frames on this channel would be arranged to have a larger priority than I and P-frames of the another channels).

As will be appreciated by a skilled artisan, the scheduler logic may prioritise frames to be processed based on any of the above criteria, either singly or in any combination thereof. In this manner, the priority of a frame that is ready for processing may be provided by:

$$P_f = \text{frame\_delay-channel\_processing\_length} + \text{urgent\_cnt} + \Delta^{frame\_type}$$

In accordance with an alternative embodiment of the invention, the scheduler logic may further comprise interrupt logic which may be periodically called by the OS 140. In this embodiment, the interrupt logic may provide a fast context switch for media processing, by periodically being called. Furthermore, the interrupt logic may also handle commands and the like for the media channels. The interrupt logic may also be provided with a higher priority, in terms of being executed by a signal processor, than both the scheduler logic and the processing engine.

Referring back to FIG. 1, as previously mentioned for the illustrated embodiment, the gateway 100 comprises a controller 150. The controller 150 may be arranged to store received control data packets. By way of example, control data packets may comprise at least one of:
commands for the scheduler logic 110;
commands for channels; and
Real-Time Control Protocol (RTCP) data packets.

Accordingly, the controller 150 may comprise separate command queues (not shown). By way of example, the controller 150 may comprise a queue for the (or each) scheduler logic 110, a channel command queue for each channel and an RTCP queue for each channel. Commands for the scheduler logic 110 may comprise, by way of example only, 'Open Channel' commands, 'Close Channel' commands, 'Change Channel Status' commands, etc. Commands for channels may be generated in a customised format, and/or may comprise, by way of example only, configuration messages such as 'Set Transcoding Type' and/or 'Set VCB configuration', status messages such as 'Get VCB Statistics', etc.

Figure 5:
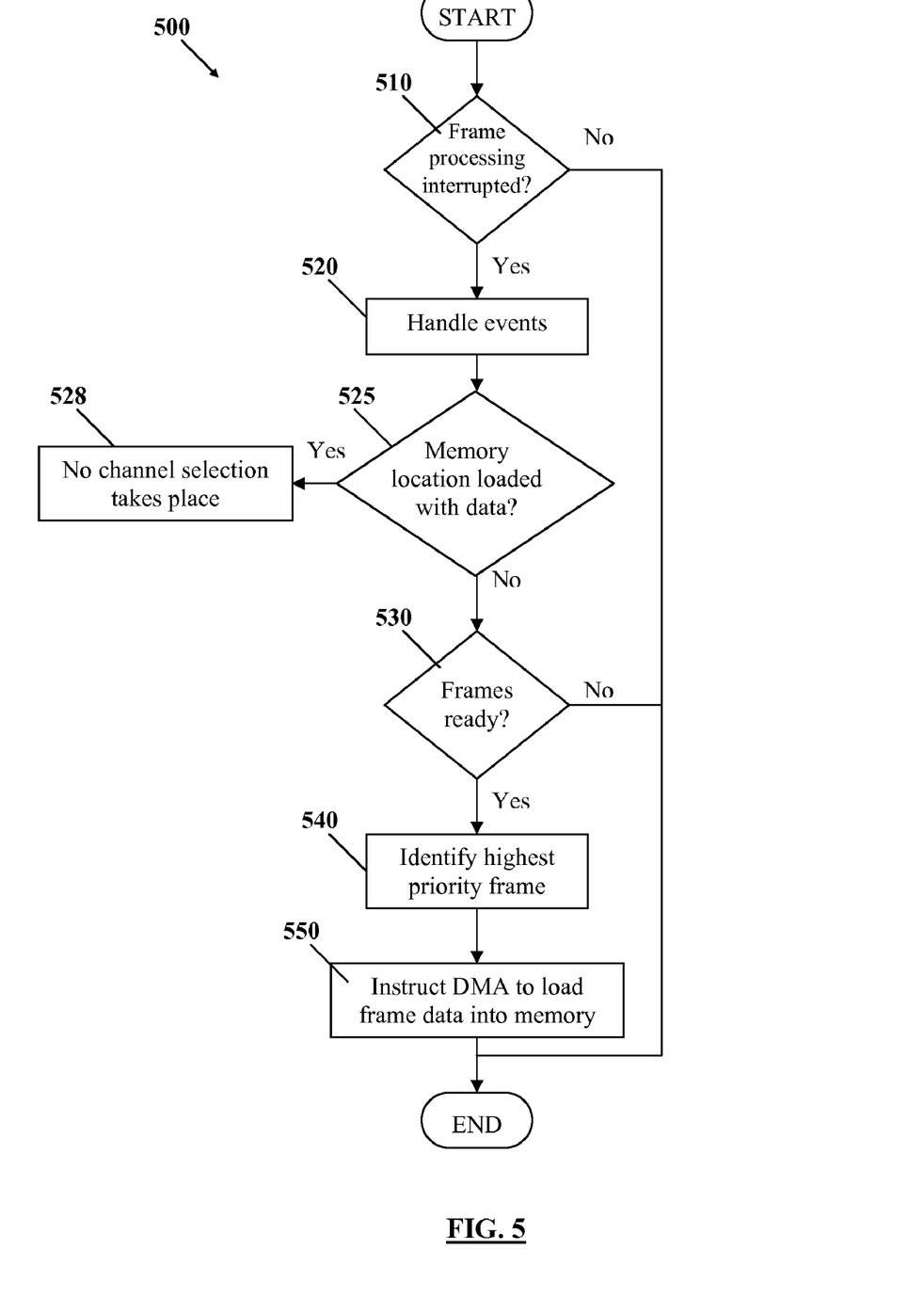
FIG. 5 illustrates a flow chart of an example of an interrupt function of a scheduler according to an embodiment of the invention.

FIG. 5 illustrates a flow chart 500 for an example operation of the interrupt logic. The flowchart starts, for example when called by say, the OS 140 of FIG. 1, and determines whether the interrupt logic has interrupted a processing of a frame as show in step 510. If frame processing has not been interrupted, in step 510, the flowchart ends. On the other hand, if the interrupt logic has interrupted the processing of a frame, the interrupt logic moves to step 520, where it handles any outstanding events. For example, as previously mentioned, the gateway may comprise a controller that stores received control packets. Thus, in step 520, the interrupt logic in this instance may process any received control data packets that have previously been stored by the controller.

Having handled any outstanding events in step 520, the operation of the interrupt logic moves to step 530, where it determines whether any frames are ready for processing (other than the frames for which processing was interrupted). If no frames are ready for processing, flowchart and therefore the operation of the interrupt logic, ends.

In an optional embodiment of the invention, prior to determining whether any frames are ready for processing, in step 530, the interrupt logic may determine whether frame data has already been loaded into memory for processing (other than for the frame for which processing was interrupted), as shown in step 525. If this is the case, the interrupt logic ends and no channel selection takes place as shown in step 528.

If one or more frames are ready for processing, in step 530, the operation of interrupt logic moves to step 540, where it identifies a frame that is ready for processing having a highest priority. Next, in step 550, the interrupt logic instructs the DMA unit to load frame data for the identified frame into memory, and thereafter the flowchart and the operation of the interrupt logic ends.

Figure 6:
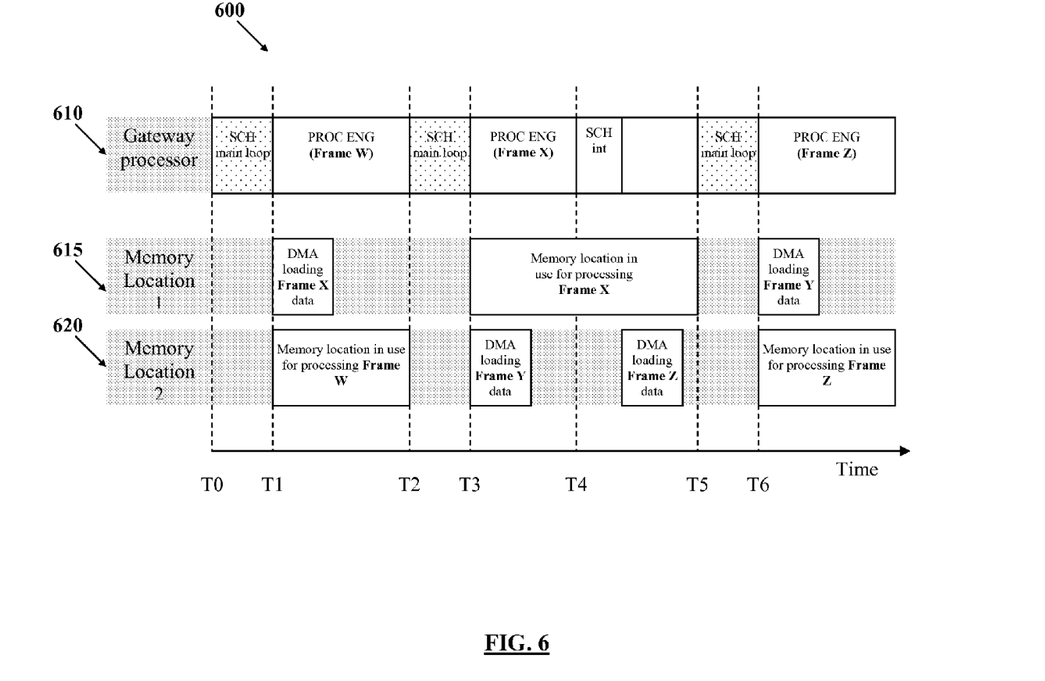
FIG. 6 illustrates a timeline for a signal processor executing a main function and an interrupt function of a scheduler and a processing engine, and memory location activity for memory locations used by the processing engine in accordance with an embodiment of the invention.

Referring now to FIG. 6, there is illustrated a timeline 600 for signal processing operations employed by, say, the scheduler logic 110 and the processing engine 130 of FIG. 1, the scheduler logic 110 and processing engine 130 being executed by gateway processor 610. Although only DMA loading is represented in FIG. 6, it is envisaged that DMA storing also exists. For example, after the processing of frame 'W' is completed, the frame 'W' data is stored in external memory and data for frame 'Y' is loaded in internal memory (in one DMA chain).

The timeline 600 also indicates memory location activity for memory locations 615, 620 used by the gateway processing engine 130 of FIG. 1 in accordance with an embodiment of the invention. In particular, at T3 memory location '2' is loaded with data for processing frame 'Y'. Then memory location is loaded with data for frame 'Z', as shown. This loading of frame 'Z' data overwrites the data for frame 'Y'. Hence, at T6 there is no data for processing frame 'Y'.

The illustrated timeline starts at time T0 with a primary function of the scheduler logic running a SCH_main_loop sub-routine, being executed by the gateway processor 610. As previously mentioned, the SCH_main_loop sub-routine polls the VCBs for frames ready to be processed Once one or more frames are ready to be processed, the scheduler logic identifies and schedules for processing the frame that is ready for processing and that has the highest priority (Frame W). The SCH_main_loop sub-routine then determines whether further frames are ready for processing, and if so instructs the DMA unit to load frame data for the identified further frame (Frame X) into memory.

In one embodiment of the invention, the main scheduler loop (SCH_main_loop sub-routine) may be implemented as the lowest interrupt from the system. In this embodiment, the SCH_main_loop sub-routine may contain an infinite loop that never exists. Thus, the implementation uses the lowest software interrupt of the Operating System and is triggered once when the system boots. In an alternative embodiment of the invention, when no Operating System is used, it is envisaged that the function may be implemented directly as a sub-routine loop.

At time T1, the SCH_main_loop sub-routine calls the processing engine, for example processing engine 130 of FIG. 1, in order for the processing engine to process the identified as having the highest priority frame (Frame W) to be processed.

In one embodiment of the invention, the processing engine module may be called by the scheduler main loop, i.e. the SCH_main_loop sub-routine. In one embodiment of the invention, the processing engine module may have the same priority as the scheduler main loop. However, in an alternative embodiment of the invention, it is envisaged that the processing engine module may be implemented as having a higher priority. In this manner, when the SCH_main_loop sub-routine calls the processing engine, the signal processor stops executing the SCH_main_loop sub-routine, and executes the processing engine. The processing engine processes the scheduled frame (Frame W), based on frame data loaded in the appropriate memory location, which at that instance in the timeline is memory location '2' 620.

As also previously mentioned, the SCH_main_loop sub-routine determines whether further frames were ready for processing, and if so instructed the DMA unit to load frame data for the identified further frame (Frame X) into memory. Thus, as illustrated in FIG. 6, whilst the processing engine processes Frame W from memory location '2' 620, the DMA unit stores the existing data from memory location '1' 615 (if it was valid data) and loads frame data for the next frame (Frame X) into memory location '1' 615.

Once the processing engine finishes processing Frame W, at time T2, the signal processor resumes executing the SCH_main_loop sub-routine. The SCH_main_loop sub-routine then loops back, and the process starts again for the next frame (Frame X) and so on.

For the embodiment illustrated in FIG. 6, the interrupt logic (SCH_int) of the scheduler logic is called at time T4, for example by the OS 140 of FIG. 1, whilst the processing engine is processing Frame X. As previously mentioned, the SCH_int sub-routine operates at a higher priority, in terms of being executed by the signal processor. In this manner, when SCH_int sub-routine is called, the signal processor stops executing the processing engine, and executes SCH_int sub-routine.

The SCH_int sub-routine handles any outstanding events, for example any commands stored by controller 150 of FIG. 1, and then determines whether any frames are ready for processing (other than Frame X). For example, as illustrated in FIG. 6, the SCH_main_loop sub-routine had previously identified Frame 'Y' as being the next frame ready for processing. However, the SCH_int sub-routine identifies Frame 'Z' as being the frame ready for processing having the highest priority, for example due to Frame 'Z' having become available since the last execution of the SCH_main_loop sub-routine. Accordingly, the SCH_int sub-routine instructs the DMA unit to load frame data for Frame 'Z' into memory. The SCH_int sub-routine then ends, and the signal processor resumes executing the processing engine 130.

In accordance with an alternative embodiment of the invention, prior to determining whether any frames are ready for processing (other than Frame X for the illustrated embodiment), the SCH_int sub-routine may determine whether frame data has already been loaded into memory (e.g. memory location '2' for the illustrated embodiment). If frame data has already been loaded into memory for the next frame to be processed, the SCH_int sub-routine ends. Thus, for the embodiment illustrated in FIG. 6, the SCH_int sub-routine would identify that Frame 'Y' data had been loaded into memory location '2', and would end without determining whether any frames (e.g. Frame 'Z') were ready for processing.

As will be appreciated by a skilled artisan, by periodically calling the interrupt logic of the scheduler, a fast context switch for media processing may be provided. Furthermore, the mechanism also provides a way to periodically process received commands, and the like.

It will be understood that the method and apparatus for scheduling a processing of media stream channels, as described above, aims to provide at least one or more of the following advantages:
  (i) greater channel density, whilst reducing latency of the media streams through the gateway by improved prioritisation of frames to be processed;
  (ii) fast context switching for frame processing through a periodic or aperiodic interrupt operation;
  (iii) graceful degradation, when a system is overloaded, through 'urgent' mode processing of frames; and
  (iv) fairer processing of channels via inclusion of channel history during prioritisation of frames to be processed.

It will be appreciated that any suitable distribution of functionality between different functional or logical units or controllers or memory elements, may be used without detracting from the inventive concept herein described. Hence, references to specific functional devices or logical elements are only to be seen as references to suitable means for providing the described functionality, rather than indicative of a strict logical or physical structure or organization.

Aspects of the invention may be implemented in any suitable form including hardware, software, firmware or any combination of these. The elements and components of an embodiment of the invention may be physically, functionally and logically implemented in any suitable way. Indeed, the functionality may be implemented in a single unit or IC, in a plurality of units or ICs, or as part of other functional units.

It will be appreciated that some embodiments of the invention may comprise one or more generic or specialised processors, or 'processing devices', such as microprocessors, digital signal processors, customised processors or field programmable gate arrays (FPGAs), where it is envisaged that unique stored program instructions may control the one or more processors to implement some or all of the functions of the method and apparatus for scheduling the processing of media stream channels as hereinbefore described.

Moreover, it is envisaged that an embodiment of the invention may be implemented as a computer-readable storage element having computer readable code stored thereon, for programming a processing device to perform a method as described and claimed herein. Examples of such computer-readable storage elements include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Programmable Read Only Memory) and a Flash memory.

Although embodiments of the invention have been described in connection with some embodiments, it is not intended to be limited to the specific form set forth herein. Rather, the scope of the invention is limited only by the accompanying claims. Additionally, although a feature may appear to be described in connection with particular embodiments, one skilled in the art would recognize that various features of the described embodiments may be combined in accordance with the invention. In the claims, the term 'comprising' does not exclude the presence of other elements or steps.

Furthermore, although individual features may be included in different claims, these may possible be advantageously combined, and the inclusion in different claims does not imply that a combination of features in a different claim set is not feasible and/or advantageous. Also, the inclusion of a feature in one category of claims does not imply a limitation to the category, but rather indicates that the feature is equally applicable to other claim categories, as appropriate.

Furthermore, the order of features in the claims does not imply any specific order in which the features must be performed. In particular, the order of individual steps in a method claim does not imply that the steps must be performed in this order. Rather, the steps may be performed in any suitable order. In addition, singular references do not exclude a plurality. Thus, references to 'a', 'an', 'first', 'second', etc. do not preclude a plurality.

Thus, an improved data communication unit comprising a decoder, a data communication network and method of decoding have been described, where the aforementioned disadvantages associated with prior art arrangements have been substantially alleviated.

The invention claimed is:

1. A method of scheduling a processing of frames of packet stream channels at a gateway, a frame comprising a plurality of packets, the method comprising:
    determining whether at least one packet stream channel comprises a frame ready for processing;
    if at least one packet stream channel comprises a frame ready for processing, identifying a frame ready for processing that has a highest priority; and scheduling the identified highest priority frame for processing, wherein:
    a frame at the gateway is not ready for processing until arrival at the gateway of a packet that completes the frame; and
    prioritising a frame of a packet stream channel ready for processing is based on at least:
        a frame availability time;
        an estimated processing time for the frame; and
        a number of times wherein frames of the packet stream channel have been processed in urgent mode.

2. The method of claim 1 further characterised by computing a frame availability time of a frame ready for processing as an oldest arrival time of a data packet that completes the frame ready for processing.

3. The method of claim 1 further characterised in that prioritising a frame comprises calculating a difference between the frame availability time and a current time, minus an estimation of a length of time required to process the frame.

4. The method of claim 1 further characterised by prior to scheduling a frame for processing, estimating a latency of that frame, and if the latency of the frame exceeds a latency threshold, processing the frame with a higher priority.

5. The method of claim 1 further characterised in that frames ready for processing are further prioritised based on at least one of:
    (i) channel history for those frames,
    (ii) a data content for those frames,
    (iii) a frame type for those frames;
    (iv) a frequency with which frames within a channel are processed with a higher priority.

6. The method of claim 1 further characterised in that determining whether at least one packet stream channel comprises a frame ready for processing comprises polling a plurality of channel buffers to obtain a status of the at least one packet channel frame.

7. The method of claim 1, wherein prioritising a frame of a packet stream channel is further based in part upon the formula:

$$P_f = \text{frame\_delay} - \text{channel\_processing\_length} + \text{urgent\_cnt} + \Delta^{frame\text{-}type}$$

wherein frame_delay is a measure of a difference between the frame availability time and a current time, channel_processing_length is an estimation of a length of time required to process the frame, urgent_cnt is a number of times wherein frames of the packet stream channel have been processed in urgent mode, and $\Delta^{frame\text{-}type}$ is a representation of a frame type.

8. The method of claim 1, wherein processing a frame in urgent mode comprises running a decoder part of a transcoder and not running an encoder part of the transcoder.

9. The method of claim 1, further comprising:
    determining that a waiting time for a frame to become complete has expired; and
    scheduling the frame based upon a time at which the waiting time has expired.

10. The method of claim 1, further comprising processing the frame, wherein the processing comprises at least one of the following:
    changing an encoding of the frame from one standard to another;
    changing a frame rate for an input media stream;
    changing a bit rate for an input media stream; and
    changing a frame size of an input media stream.

11. The method of claim 1, further comprising processing a frame of the frames of the packet stream channel in urgent mode based upon a latency of the frame exceeding a latency threshold for the frame.

12. An Integrated Circuit for scheduling a processing of packet stream channels, wherein the integrated circuit comprises:
    logic for determining whether at least one packet stream channel comprises a frame ready for processing, wherein a frame comprises a plurality of packets and a frame is not ready for processing until arrival at the Integrated Circuit of a packet that completes the frame and if at least one packet stream channel comprises a frame ready for processing, identifying a frame ready for processing that has a highest priority; and
    scheduler logic operably coupled to the logic for determining and arranging to schedule the identified highest priority frame for processing;
    wherein the scheduler logic is arranged to prioritise a frame of a packet stream channel ready for processing based on at least: a frame availability time; an estimated processing time for the frame; and a number of times wherein frames of the packet stream channel have been processed in urgent mode.

13. The Integrated Circuit of claim 12 further characterised in that the scheduler logic is arranged to compute the frame availability time of a frame ready for processing as an oldest arrival time of a data packet that completes the frame ready for processing.

14. The Integrated Circuit of claim 12 further characterised in that the scheduler logic is arranged to prioritise a frame ready for processing by calculating a difference between the frame availability time and a current time, minus an estimation of a length of time to process the frame.

15. The Integrated Circuit of claim 12 further characterised in that the scheduler logic is arranged to, prior to scheduling a frame, estimate a latency of that frame, and if the latency of the frame exceeds a latency threshold, process the frame with a higher priority.

16. The Integrated Circuit of claim 12 further characterised by the scheduler logic is arranged to further prioritise frames ready for processing based on at least one of:
    (i) channel history for those frames,
    (ii) a data content for those frames,
    (iii) a frame type for those frames,
    (iv) a frequency with which frames within a channel are processed with a higher priority.

17. The Integrated Circuit of claim 12 further characterised by the Integrated Circuit further comprising a plurality of channel buffers arranged to receive and store data packets; wherein the scheduler logic is arranged to determine whether at least one packet stream channel comprises a frame ready for processing by polling the plurality of channel buffers to obtain a status of the at least one packet channel frame.

18. A communication unit comprising the integrated circuit of claim 12.

19. A non-transitory computer-readable storage element having computer-readable code stored thereon for programming a computer to perform a method of scheduling a processing of packet stream channels, the method comprising:
    determining whether at least one packet stream channel comprises a frame ready for processing, wherein a frame comprises a plurality of packets and a frame is not ready for processing until arrival of a packet that completes the frame at a computer, wherein the computer contains the non-transitory computer-readable storage element; and if at least one packet stream channel comprises a frame ready for processing, identifying a frame ready for processing that has a highest priority; and scheduling the identified highest priority frame;
    wherein prioritising a frame of a packet stream channel ready for processing is based on at least a frame availability time, an estimated processing time for the frame, and a number of times wherein frames of the packet stream channel have been processed in urgent mode.

20. The computer-readable storage element of claim 19 further characterised by the computer-readable storage element comprising at least one of a hard disk, a CD-ROM, an optical storage device, a magnetic storage device, a ROM (Read Only Memory), a PROM (Programmable Read Only Memory), a EPROM (Erasable Programmable Read Only Memory), a EEPROM (Electronically Erasable Programmable Read Only Memory and a Flash memory.

* * * * *